(12) United States Patent
Chang et al.

(10) Patent No.: US 12,032,418 B2
(45) Date of Patent: Jul. 9, 2024

(54) TOUCHPAD APPARATUS FOR AN INFORMATION HANDLING SYSTEM

(71) Applicant: Dell Products L.P., Round Rock, TX (US)

(72) Inventors: Yaotsung Chang, Taipei (TW); Tsan-Wei Liu, New Taipei (TW); HouChun Wang, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 235 days.

(21) Appl. No.: 17/809,287

(22) Filed: Jun. 28, 2022

(65) Prior Publication Data

US 2023/0418341 A1 Dec. 28, 2023

(51) Int. Cl.
*G06F 1/16* (2006.01)

(52) U.S. Cl.
CPC .................................. *G06F 1/169* (2013.01)

(58) Field of Classification Search
None
See application file for complete search history.

(56) References Cited

U.S. PATENT DOCUMENTS

2019/0384426 A1* 12/2019 Huang .................. G06F 3/0362
2022/0113819 A1* 4/2022 Li ........................... G06F 1/169

* cited by examiner

*Primary Examiner* — Jerry Wu
(74) *Attorney, Agent, or Firm* — McDermott Will & Emery LLP

(57) ABSTRACT

A touchpad apparatus including a holder bracket; a holder body; a plurality of elastic articles; and a touchpad printed circuit board (PCB) coupled to the first side of the holder body, the touchpad PCB including a switch member positioned at a first end of the touchpad PCB, wherein, when the holder body is in a first positional state, the plurality of elastic articles are in a first elastic state such that the switch member is disengaged, wherein, when the holder body is in a second positional state, the plurality of elastic articles are in a second elastic state such that the switch member is engaged to provide a signal indicating the second positional state of the holder body.

12 Claims, 9 Drawing Sheets

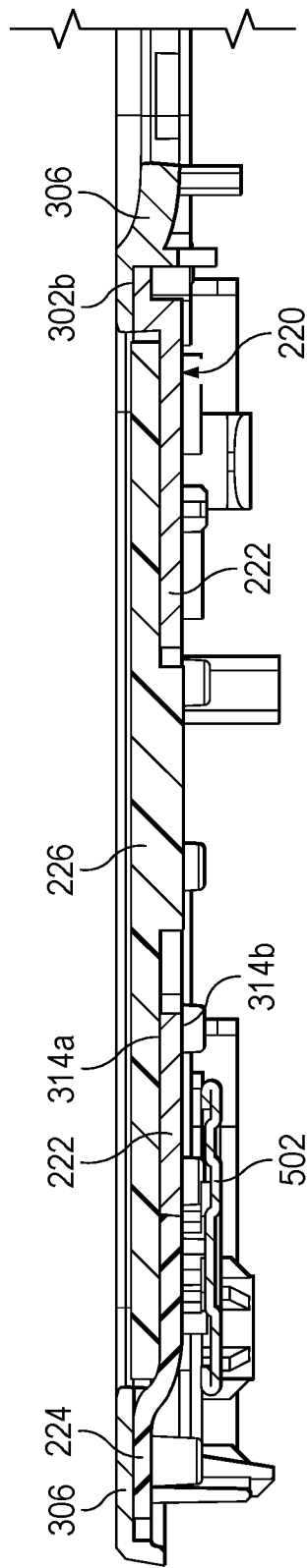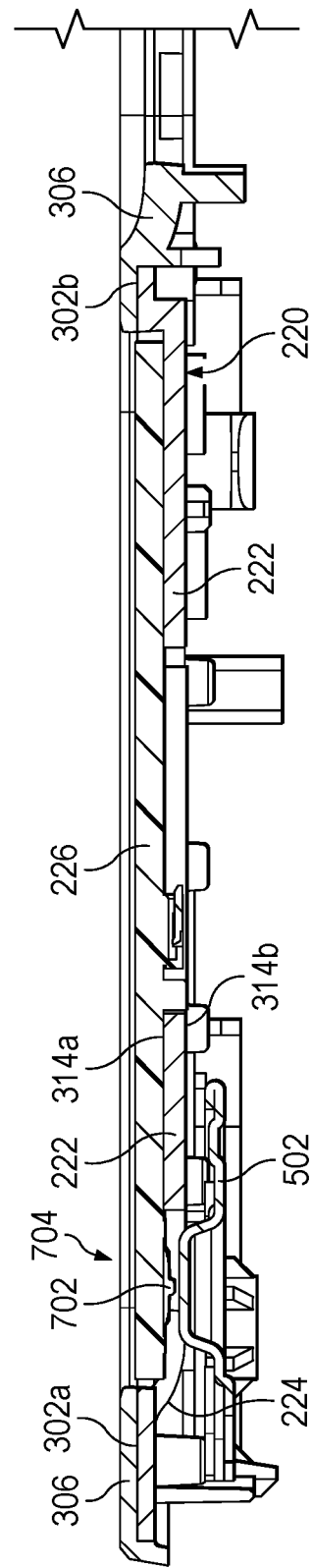
FIG. 7A
FIG. 7B

TOUCHPAD APPARATUS FOR AN INFORMATION HANDLING SYSTEM

BACKGROUND

Field of the Disclosure

The disclosure relates generally to an information handling system, and in particular, a touchpad apparatus for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a touchpad apparatus for an information handling system, including a holder bracket having a first end and a second end, the second end of the holder bracket opposite to the first end of the holder bracket; a holder body having a first end and a second end, the second end of the holder body opposite the first end of the holder body, the second end of the holder body coupled to the second end of the holder bracket, the holder body further having a first side and a second side both extending between the first end and the second end of the holder body, the first side opposite to the second side, wherein the holder body is pivotable about the second end of the holder body; a plurality of elastic articles each having a first end and a second end, the second end of the plurality of elastic articles positioned opposite to the first end of the plurality of elastic articles, the first end of each of the plurality of elastic articles coupled to the first end of the holder bracket, and the second end of each of the plurality of elastic articles coupled to the first end of the holder body; and a touchpad printed circuit board (PCB) coupled to the first side of the holder body, the touchpad PCB including a switch member positioned at a first end of the touchpad PCB, wherein, when the holder body is in a first positional state, the plurality of elastic articles are in a first elastic state such that the switch member is disengaged, wherein, when the holder body is in a second positional state, the plurality of elastic articles are in a second elastic state such that the switch member is engaged to provide a signal indicating the second positional state of the holder body.

Other embodiments of these aspects include corresponding systems and apparatus.

These and other embodiments may each optionally include one or more of the following features. For instance, the first end of the holder body includes a plurality of first recessions, wherein the second end of each elastic article of the plurality of elastic articles is positioned within a respective first recession of the plurality of first recessions. The second end of each elastic article of the plurality of elastic articles is coupled to the holder body at the respective first recession it is positioned within. The first end of the holder bracket include a plurality of second recessions, wherein the first end of each elastic article of the plurality of elastic articles is positioned within a respective second recession of the plurality of second recessions. The holder bracket is bonded to a palm rest of the information handling system at the first end and the second end of the holder bracket. The holder bracket surrounds the holder body. The plurality of elastic articles are formed from rubber, elastic material, or a combination of both. The plurality of elastic articles are formed from a metallic spring material.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIG. 7A, 7B illustrate respective cut-away side views of the touchpad apparatus coupled to the palm rest, in a first state.

DESCRIPTION OF PARTICULAR EMBODIMENT(S)

Figure 1:
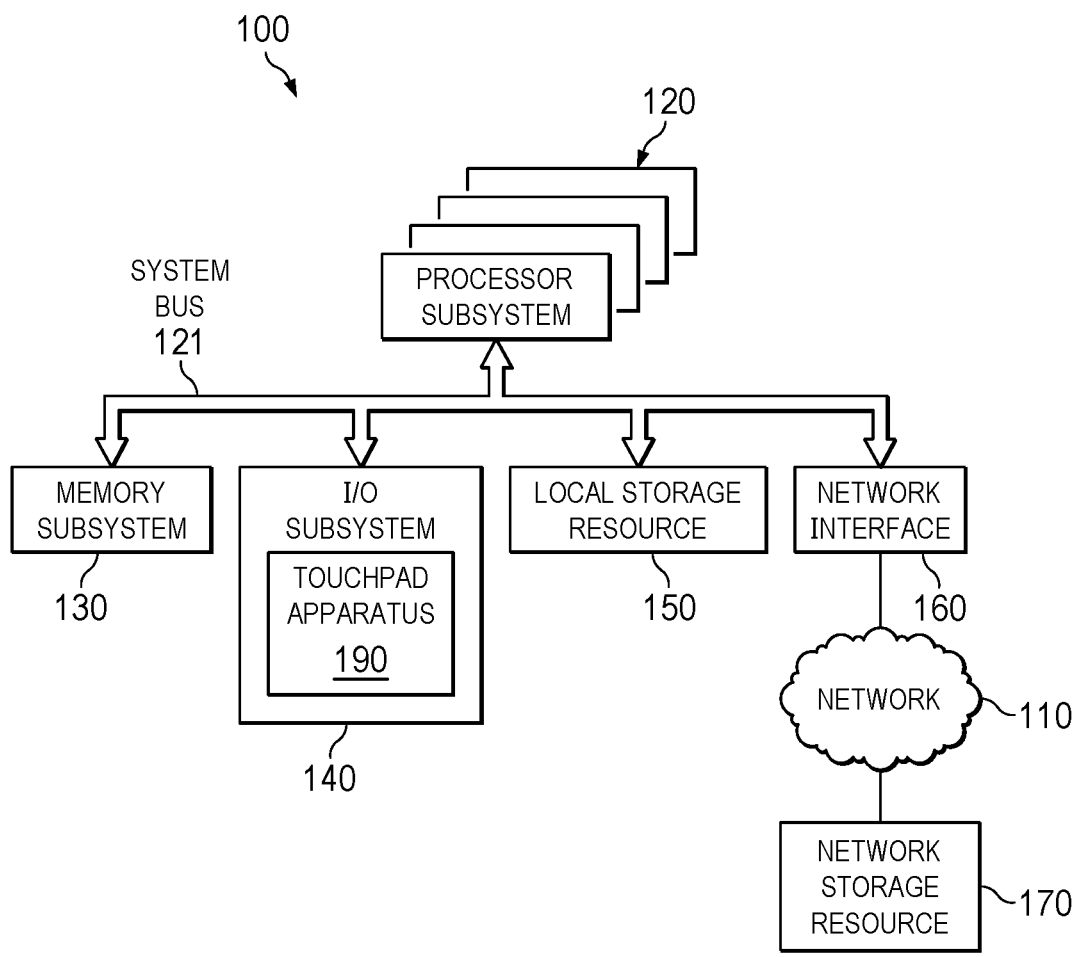
FIG. 1 is a block diagram of selected elements of an embodiment of an information handling system.

This disclosure discusses a touchpad apparatus of an information handling system including a holder bracket having a first end and a second end, the second end of the holder bracket opposite to the first end of the holder bracket; a holder body having a first end and a second end, the second end of the holder body opposite the first end of the holder body, the second end of the holder body coupled to the second end of the holder bracket, the holder body further having a first side and a second side both extending between the first end and the second end of the holder body, the first side opposite to the second side, wherein the holder body is pivotable about the second end of the holder body; a plurality of elastic articles each having a first end and a second end, the second end of the plurality of elastic articles positioned opposite to the first end of the plurality of elastic articles, the first end of each of the plurality of elastic articles coupled to the first end of the holder bracket, and the second end of each of the plurality of elastic articles coupled to the first end of the holder body; and a touchpad printed circuit board (PCB) coupled to the first side of the holder body, the touchpad PCB including a switch member positioned at a first end of the touchpad PCB, wherein, when the holder body is in a first positional state, the plurality of elastic articles are in a first elastic state such that the switch member is disengaged, wherein, when the holder body is in a second positional state, the plurality of elastic articles are in a second elastic state such that the switch member is engaged to provide a signal indicating the second positional state of the holder body.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-7 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

The information handling system 100 can further include a touchpad apparatus 190.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
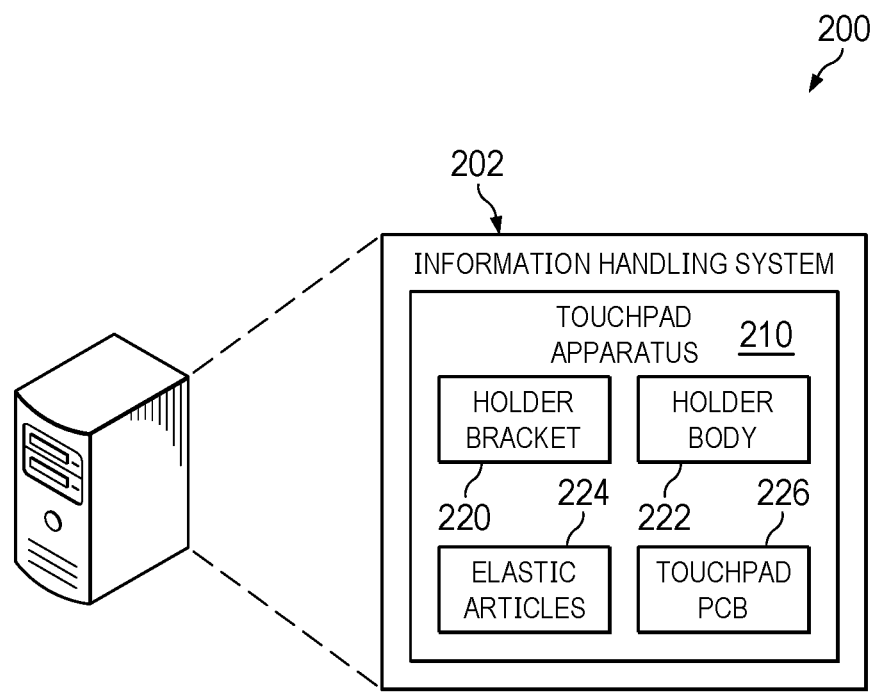
FIG. 2 illustrates a block diagram of an information handling system, including a touchpad apparatus.

Turning to FIG. 2, FIG. 2 illustrates an environment 200 including an information handling system 202. The information handling system 202 can include a touchpad apparatus 210. The touchpad apparatus 210 can include a holder bracket 220, a holder body 222, a plurality of elastic articles 224, and a touchpad printed circuit board (PCB) 226. In some examples, the information handling system 202 is similar to, or includes, the information handling system 100 of FIG. 1. In some examples, the touchpad apparatus 210 is the same, or substantially the same, as the touchpad apparatus 190 of FIG. 1.

Figure 3A:
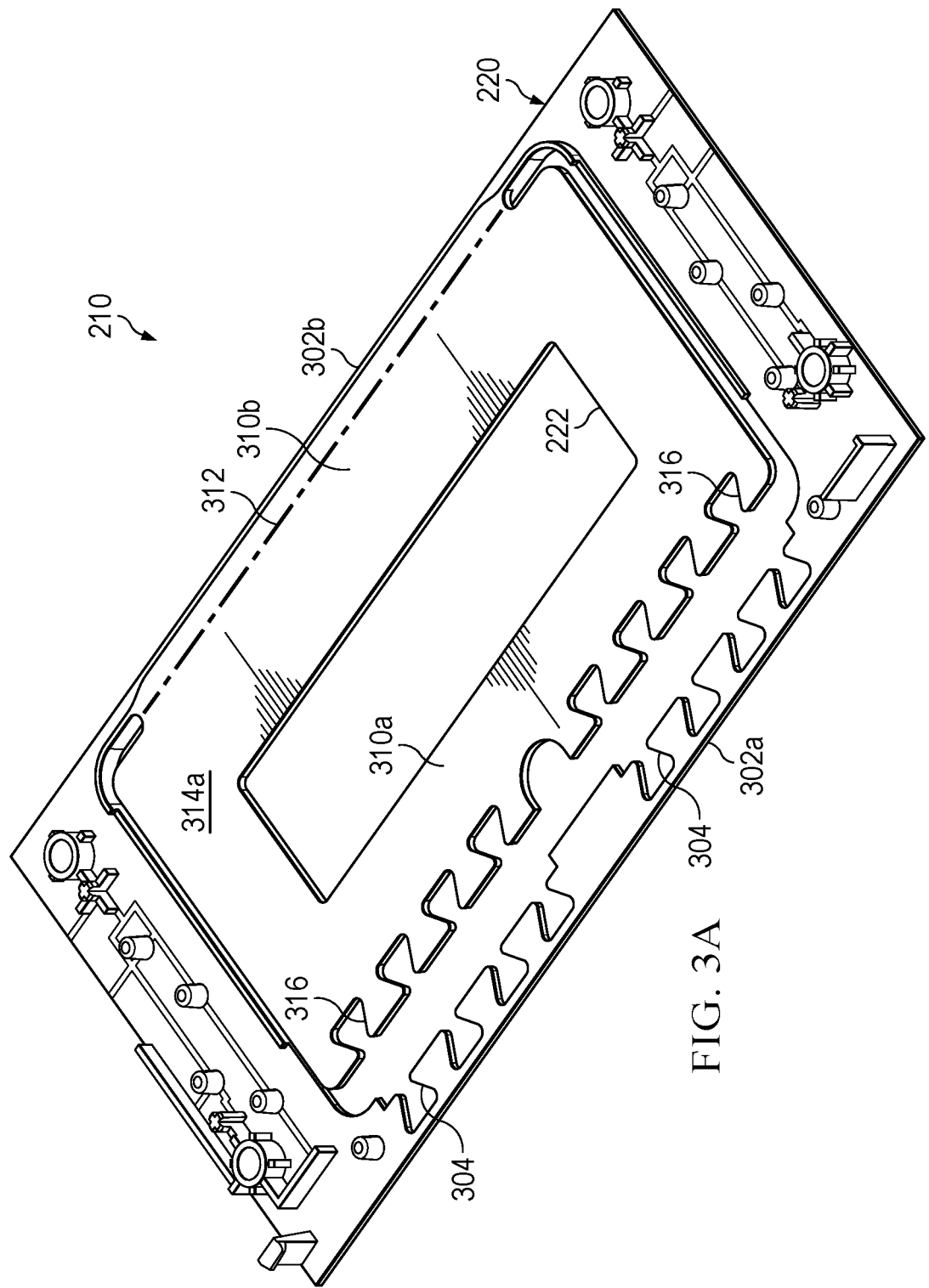
FIGS. 3A, 3B illustrates perspective views of the touchpad apparatus.
Figure 3B:
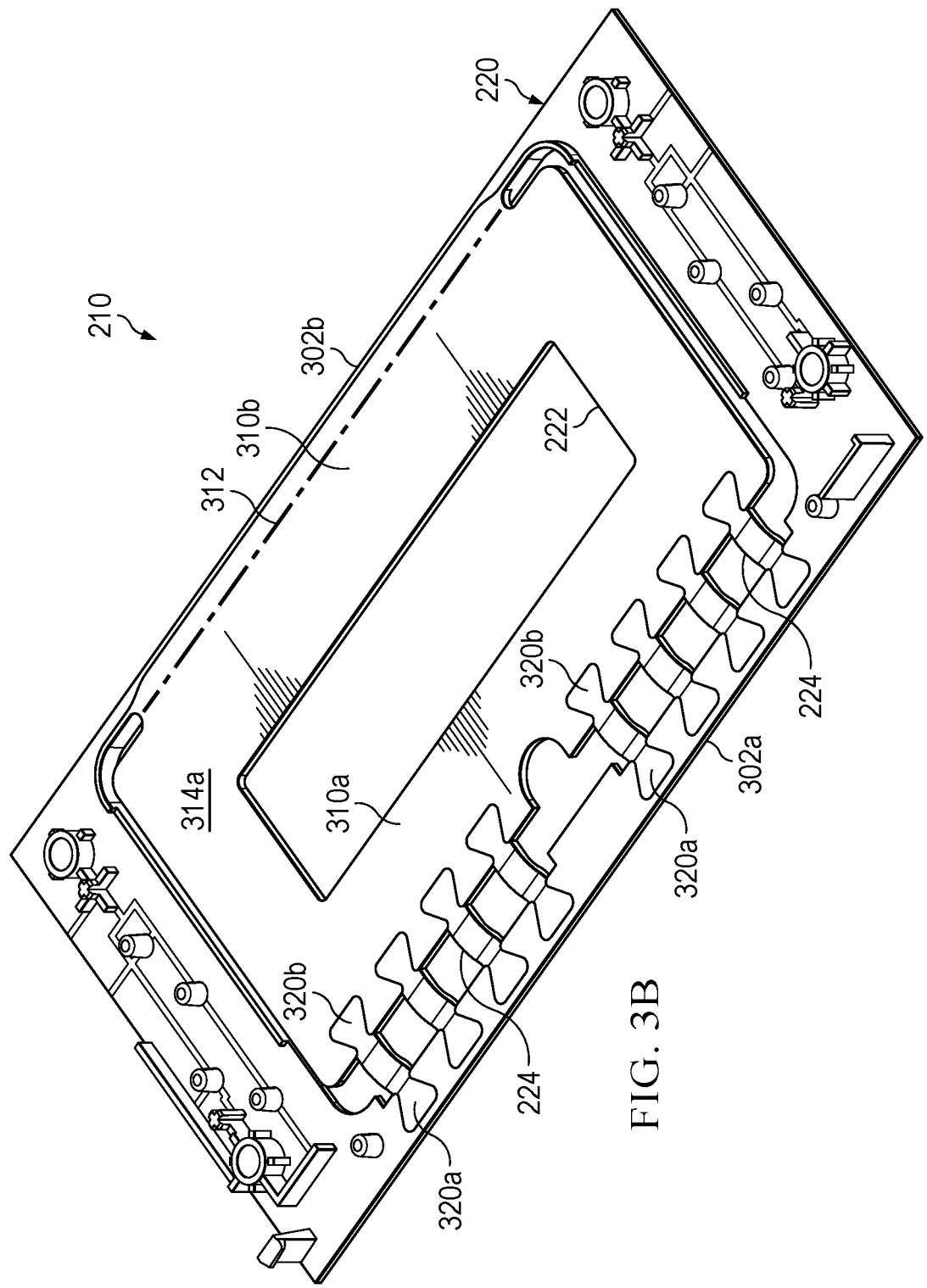

FIGS. 3A, 3B illustrates perspective views of the touchpad apparatus 210. Referring to FIGS. 3A, 3B, the touchpad apparatus 210 can include the holder bracket 220, the holder body 222, the elastic articles 224, and the touchpad PCB 226 (shown in FIGS. 7A, 7B).

The holder bracket 220 can include a first end 302a and a second end 302b. The second end 302b of the holder bracket 220 is opposite to the first end 302a of the holder bracket 220. The first end 302a of the holder bracket 220 can include a plurality of second recessions 304. The holder bracket 220 is bonded to a palm rest 306 of the information handling system 202, shown in FIG. 4. Specifically, the holder bracket 220 is bonded to the palm rest 306 at the first end 302a and the second end 302b of the holder bracket 220, shown in FIGS. 7A, 7B. The palm rest 306 can be formed from a metallic material or a plastic material.

The holder body 222 can include a first end 310a and a second end 310b. The second end 310b of the holder body 222 can be positioned opposite to the first end 310a of the holder body 222. The second end 310b of the holder body 222 is coupled to the second end 302b of the holder bracket 220 to form an axis of pivot (or rotation) 312. The holder body 222 further includes a first side 314a and a second side 314b (shown in FIGS. 7A, 7B). The first side 314a and the second side 314b both extend between the first end 310a and the second end 310b of the holder body 222. The first side 314a of the holder body 222 is opposite to the second side 314b of the holder body 222. To that end, the holder body 222 is pivotable (and/or rotatable) about the second end 310b of the holder body 222, and more specifically, pivotable (and/or rotatable) about the axis of pivot (or rotation) 312.

The first end 310a of the holder body 222 can further include a plurality of first recessions 316.

The holder bracket 220 can substantially surround the holder body 222.

The elastic articles 224 each have a first end 320a and a second end 320b. The second end 320b of each of the elastic articles 224 is positioned opposite to the first end 320a of the respective elastic article 224. To that end, the first end 320a of each of the elastic articles 224 is coupled to the first end 302a of the holder bracket 220. Specifically, the first end 320a of each of the elastic articles 224 is positioned within a respective second recession 304 of the plurality of second recessions 304 of the holder bracket 220. That is, the first end 320a of each of the elastic articles 224 is coupled to the holder bracket 220 at the respective second recession 304 it is positioned within.

Furthermore, the second end 320b of each of the elastic articles 224 is coupled to the first end 310a of the holder body 222. Specifically, the second end 320b of each of the elastic articles 224 is positioned within a respective first recession 316 of the plurality of first recession 316 of the holder body 222. That is, the second end 320b of each of the elastic articles 224 is coupled to the holder body 222 at the respective first recession 316 it is positioned within.

In some examples, the plurality of elastic articles 224 are formed from rubber, elastic material, or a combination of the both. In some examples, the plurality of elastic articles 224 are formed from a metallic spring material. The material of the elastic articles 224 provides elasticity to achieve the "click" functionality of the touchpad apparatus 210.

Figure 4:
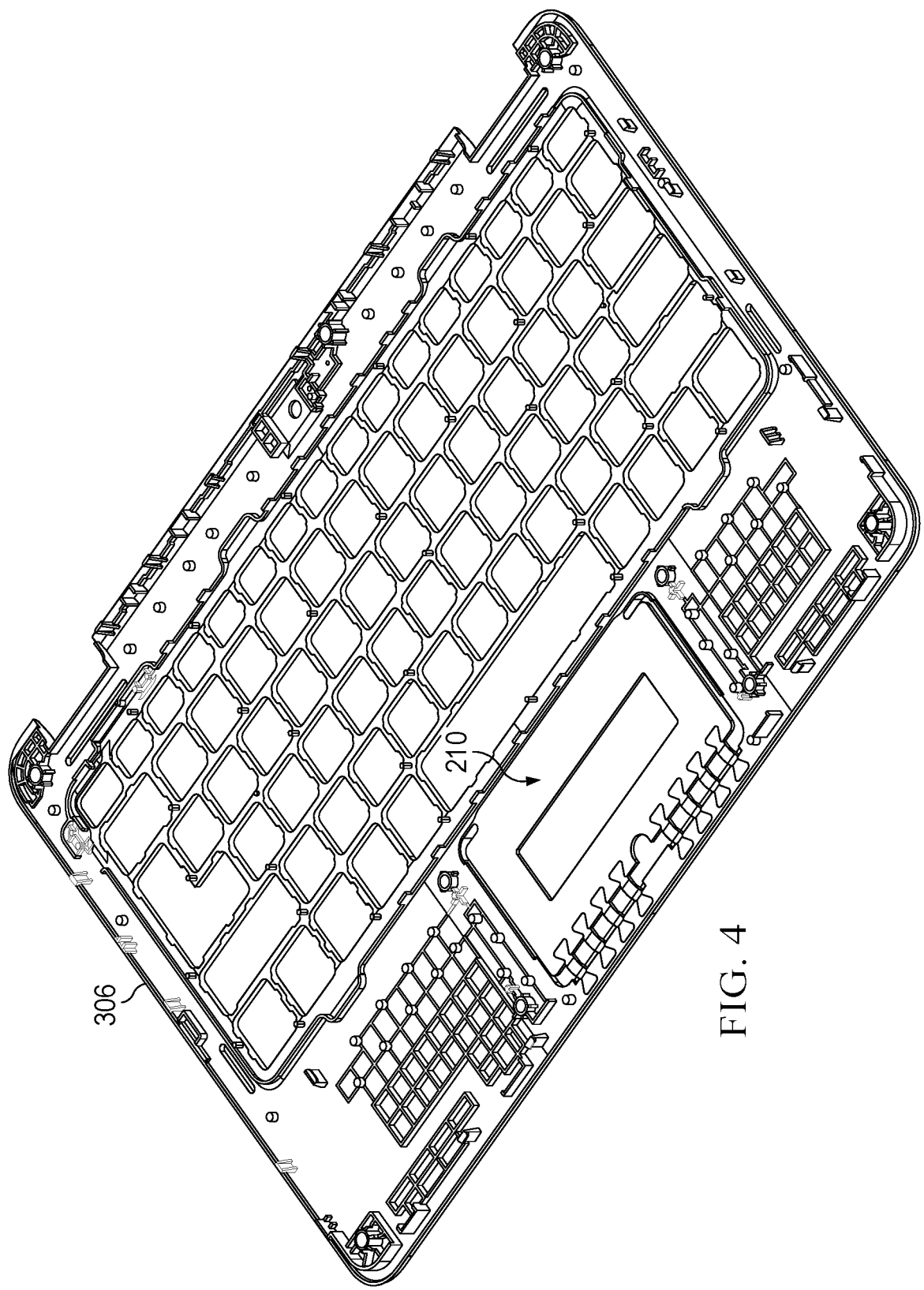
FIG. 4 illustrates a perspective view of the touchpad apparatus coupled to a palm rest.

FIG. 4 illustrates a perspective view of the touchpad apparatus 210 coupled to the palm rest 306.

Figure 5:
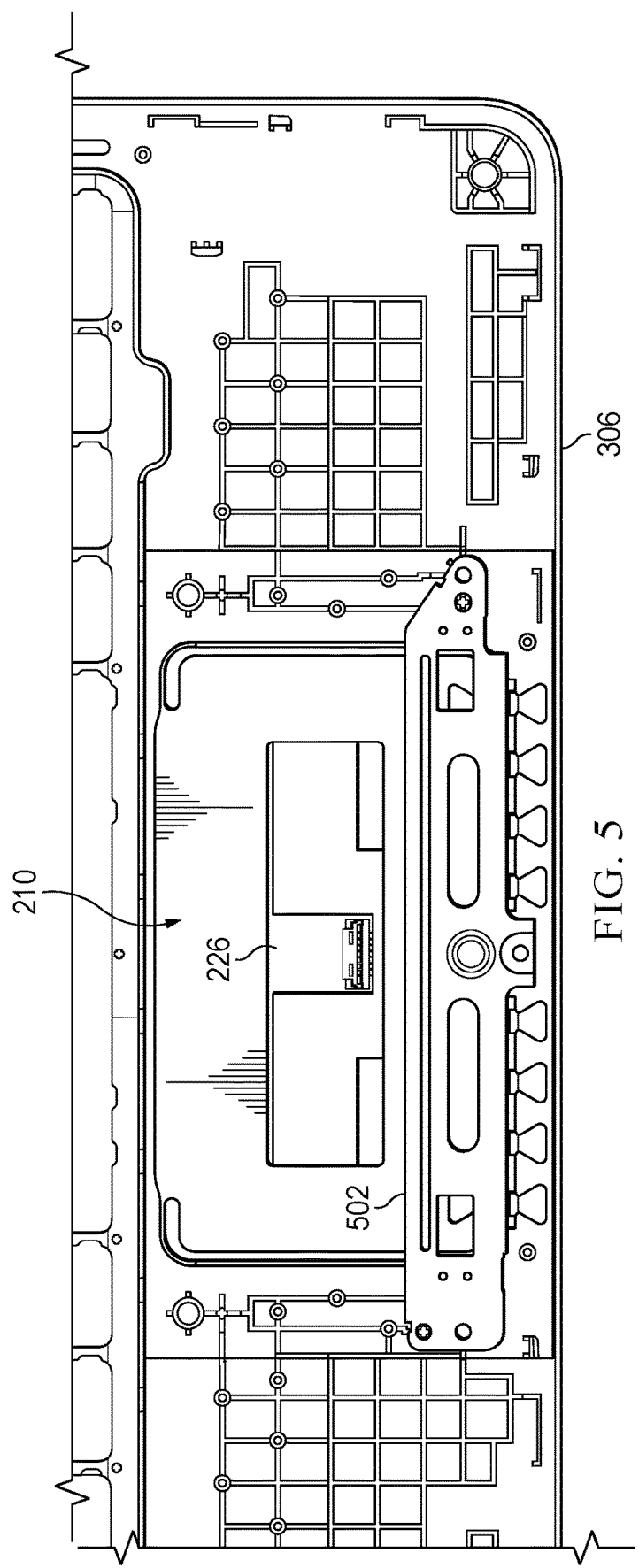
FIG. 5 illustrates top down view of the touchpad apparatus coupled to the palm rest.

FIG. 5 illustrates top down view of the touchpad apparatus 210 coupled to the palm rest 306. In some examples, a support bracket 502 can facilitate coupling of the touchpad apparatus 210 to the palm rest 306. That is, the support bracket 502 couples the touchpad apparatus 210 to the palm rest 306 through one or more coupling means (e.g., fasteners).

Figure 6:
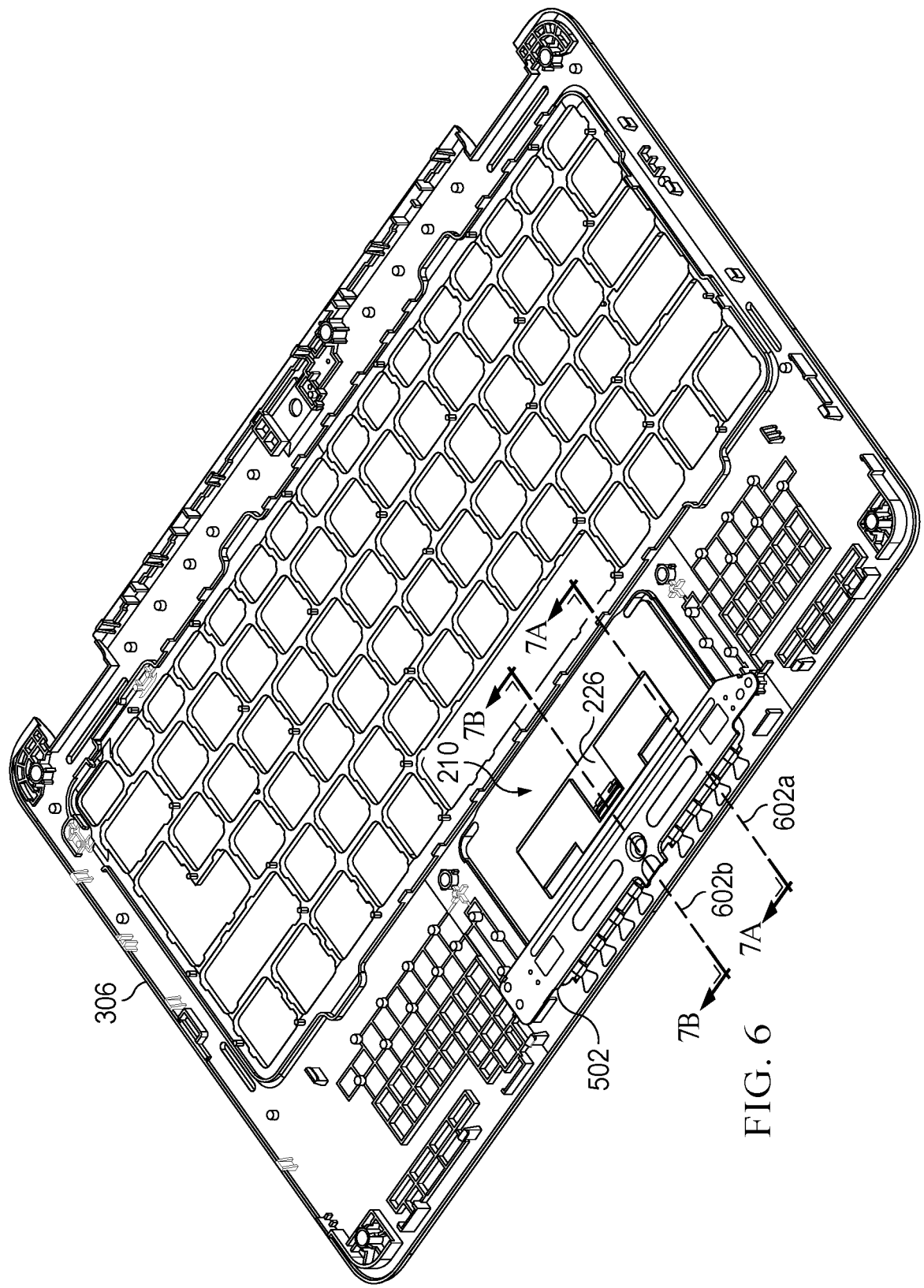
FIG. 6 illustrates a perspective view of the touchpad apparatus coupled to the palm rest, including a support bracket.
Figure 8A:
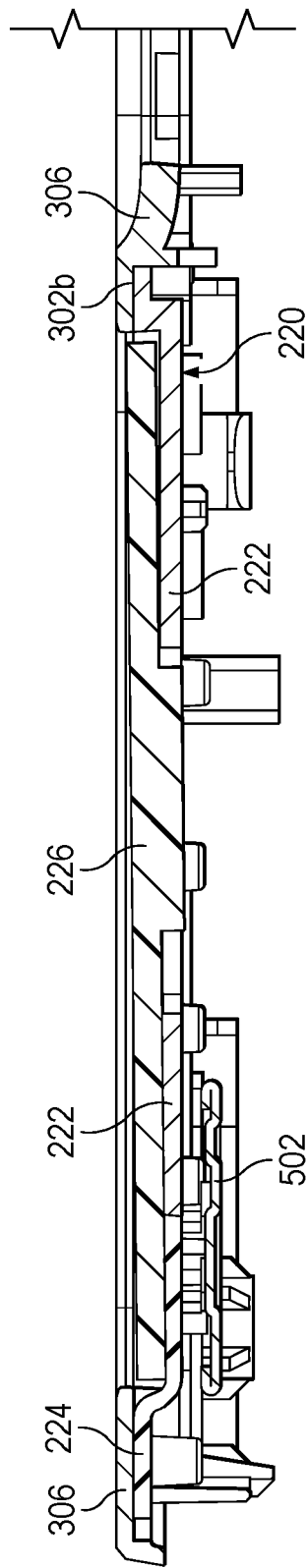
FIG. 8A, 8B illustrate respective cut-away side views of the touchpad apparatus coupled to the palm rest, in a second state.
Figure 8B:
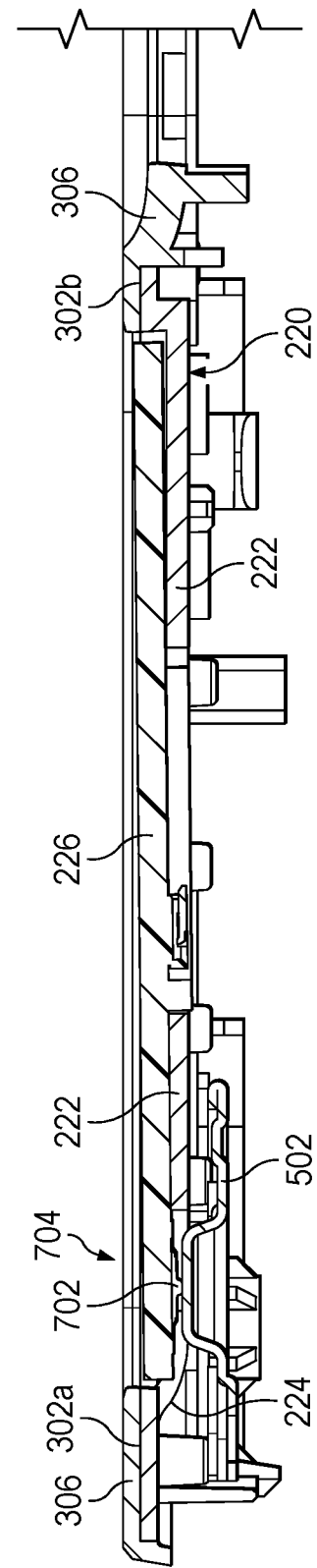

FIG. 6 illustrates a perspective view of the touchpad apparatus 210 coupled to the palm rest 306, including the support bracket 502. FIG. 7A illustrates a cut-away side view of the touchpad apparatus 210 coupled to the palm rest 306, along the line 602a; and FIG. 7B illustrates a cut-away side view of the touchpad apparatus 210 coupled to the palm rest 306, along the line 602b. Referring to FIGS. 6, 7A, 7B, the touchpad PCB 226 is coupled to the first side 314a of the holder body 222. The touchpad PCB 226 includes a switch member 702. The switch member 702 is positioned at a first end 704 of the touchpad PCB 226.

Referring to FIGS. 3B, 6, 7A, 7B, the holder body 222 can be in a first positional state. When the holder body 222 is in the first positional state, the elastic articles 224 are in a first elastic state. That is, the elastic articles 224 are "unflexed" and under a first elastic tension. The elastic articles 224 are in the first elastic state such that the switch member 702 is disengaged. That is, the switch member 702 is not in contact with the support bracket 502.

Referring to FIGS. 3, 6, 8A, 8B, the holder body 222 can be in a second positional state. When the holder body 222 is in the second positional state, the elastic articles 224 are in a second elastic state. That is, the elastic articles are "flexed" and under a second elastic tension (greater than the first elastic tension). When the holder body 222 is in the second positional state, the holder body 222 pivots (or rotates) about the second end 310b of the holder body 222, and more specifically, pivots (or rotates) about the axis of pivot (or rotation) 312.

The elastic articles 224 are in the second elastic state such that the switch member is engaged. That is, the switch member 702 is in contact with the support bracket 502. When the switch member 702 is engaged and in contact with the support bracket 502, the switch 702 and/or the touchpad PCB 226 provide a signal indicating that the holder body 222 is in the second state. That is, the signal can indicate that the holder body 222 is in the second state, and that the touchpad apparatus 210 has been "clicked."

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touchpad apparatus of an information handling system, the apparatus including:
    a holder bracket having a first end and a second end, the second end of the holder bracket opposite to the first end of the holder bracket;
    a holder body having a first end and a second end, the second end of the holder body opposite the first end of the holder body, the second end of the holder body coupled to the second end of the holder bracket, the holder body further having a first side and a second side both extending between the first end and the second end of the holder body, the first side opposite to the second side, wherein the holder body is pivotable about the second end of the holder body;
    a plurality of elastic articles each having a first end and a second end, the second end of the plurality of elastic articles positioned opposite to the first end of the plurality of elastic articles, the first end of each of the plurality of elastic articles coupled to the first end of the holder bracket, and the second end of each of the plurality of elastic articles coupled to the first end of the holder body; and
    a touchpad printed circuit board (PCB) coupled to the first side of the holder body, the touchpad PCB including a switch member positioned at a first end of the touchpad PCB,
    wherein, when the holder body is in a first positional state, the plurality of elastic articles are in a first elastic state such that the switch member is disengaged,
    wherein, when the holder body is in a second positional state, the plurality of elastic articles are in a second elastic state such that the switch member is engaged to provide a signal indicating the second positional state of the holder body,
    wherein both the first end of the holder body and the holder bracket include a plurality of first and second recessions, respectively, wherein the second end and the first end of each elastic article of the plurality of elastic articles is positioned within a respective recession of the plurality of the first and second recessions, respectively.

2. The touchpad apparatus of claim 1, wherein the second end of each elastic article of the plurality of elastic articles is coupled to the holder body at the respective first recession it is positioned within.

3. The touchpad apparatus of claim 1, wherein the holder bracket is bonded to a palm rest of the information handling system at the first end and the second end of the holder bracket.

4. The touchpad apparatus of claim 1, wherein the holder bracket surrounds the holder body.

5. The touchpad apparatus of claim 1, wherein the plurality of elastic articles are formed from rubber, elastic material, or a combination of both.

6. The touchpad apparatus of claim 1, wherein the plurality of elastic articles are formed from a metallic spring material.

7. An information handling system, comprising:
a processor;
memory media storing instructions executable by the processor to perform operations;
a touchpad apparatus, including:
a holder bracket having a first end and a second end, the second end of the holder bracket opposite to the first end of the holder bracket;
a holder body having a first end and a second end, the second end of the holder body opposite the first end of the holder body, the second end of the holder body coupled to the second end of the holder bracket, the holder body further having a first side and a second side both extending between the first end and the second end of the holder body, the first side opposite to the second side, wherein the holder body is pivotable about the second end of the holder body;
a plurality of elastic articles each having a first end and a second end, the second end of the plurality of elastic articles positioned opposite to the first end of the plurality of elastic articles, the first end of each of the plurality of elastic articles coupled to the first end of the holder bracket, and the second end of each of the plurality of elastic articles coupled to the first end of the holder body; and
a touchpad printed circuit board (PCB) coupled to the first side of the holder body, the touchpad PCB including a switch member positioned at a first end of the touchpad PCB,
wherein, when the holder body is in a first positional state, the plurality of elastic articles are in a first elastic state such that the switch member is disengaged,
wherein, when the holder body is in a second positional state, the plurality of elastic articles are in a second elastic state such that the switch member is engaged to provide a signal indicating the second positional state of the holder body,
wherein both the first end of the holder body and the holder bracket include a plurality of first and second recessions, respectively,
wherein the second end and the first end of each elastic article of the plurality of elastic articles is positioned within a respective recession of the plurality of the first and second recessions, respectively.

8. The information handling system of claim 6, wherein the second end of each elastic article of the plurality of elastic articles is coupled to the holder body at the respective first recession it is positioned within.

9. The information handling system of claim 7, wherein the holder bracket is bonded to a palm rest of the information handling system at the first end and the second end of the holder bracket.

10. The information handling system of claim 7, wherein the holder bracket surrounds the holder body.

11. The information handling system of claim 7, wherein the plurality of elastic articles are formed from rubber, elastic material, or a combination of both.

12. The information handling system of claim 7, wherein the plurality of elastic articles are formed from a metallic spring material.

* * * * *